(12) United States Patent
Ozawa et al.

(10) Patent No.: US 7,750,087 B2
(45) Date of Patent: Jul. 6, 2010

(54) MODIFIED POLYMERS PREPARED WITH LANTHANIDE-BASED CATALYSTS

(75) Inventors: Yoichi Ozawa, Kodaira (JP); H. Jerrold Miller, Panama City, FL (US); Koji Masaki, Fairlawn, OH (US); Tatsuo Fujimaki, Higashimurayama (JP); Takuo Sone, Tokyo (JP); Iwakazu Hattori, Tokyo (JP); Koichi Morita, Higashiyamato (JP)

(73) Assignee: Bridgestone Corporation (JP)

( * ) Notice: Subject to any disclaimer, the term of this patent is extended or adjusted under 35 U.S.C. 154(b) by 1149 days.

(21) Appl. No.: 11/244,999

(22) Filed: Oct. 6, 2005

(65) Prior Publication Data

US 2006/0030677 A1 Feb. 9, 2006

Related U.S. Application Data

(63) Continuation of application No. 10/296,084, filed on Aug. 14, 2003, now Pat. No. 6,992,147.

(51) Int. Cl.
C08C 19/00 (2006.01)
C08F 8/00 (2006.01)

(52) U.S. Cl. .................. 525/342; 525/105; 525/343; 525/377

(58) Field of Classification Search ............... 525/105, 525/342, 343, 377
See application file for complete search history.

(56) References Cited

U.S. PATENT DOCUMENTS

| | | | |
|---|---|---|---|
| 1,223,396 A | 4/1917 | Karlsson | |
| 2,227,957 A | 1/1941 | Brasse | |
| 3,297,667 A | 1/1967 | Von Dohlen et al. | 260/82.1 |
| 3,541,063 A | 11/1970 | Throckmorton et al. | 260/82.1 |
| 3,794,604 A | 2/1974 | Throckmorton et al. | 252/431 |
| 4,185,042 A | 1/1980 | Verkouw | 525/332 |
| 4,461,883 A | 7/1984 | Takeuchi et al. | 526/139 |
| 4,751,275 A | 6/1988 | Witte et al. | 526/139 |
| 4,791,174 A | 12/1988 | Bronstert et al. | |
| 4,906,706 A | 3/1990 | Hattori et al. | 525/343 |
| 4,990,573 A | 2/1991 | Andreussi et al. | 525/332.3 |
| 5,064,910 A | 11/1991 | Hattori et al. | 525/359.1 |
| 5,066,729 A | 11/1991 | Stayer et al. | 525/332 |
| 5,109,907 A | 5/1992 | Stayer, Jr. et al. | 152/654 |
| 5,227,431 A | 7/1993 | Lawson et al. | 525/237 |
| 5,310,798 A * | 5/1994 | Lawson et al. | 525/102 |
| 5,508,333 A | 4/1996 | Shimizu | 524/424 |
| 5,567,784 A | 10/1996 | Wieder et al. | 526/164 |
| 5,844,050 A | 12/1998 | Fukahori et al. | 525/351 |
| 5,866,171 A | 2/1999 | Kata | 425/46 |
| 5,866,650 A | 2/1999 | Lawson et al. | 524/572 |
| 5,876,527 A | 3/1999 | Tsuruta et al. | 152/541 |
| 5,916,961 A | 6/1999 | Hergenrother et al. | 524/572 |
| 5,931,211 A | 8/1999 | Tamura | 152/209.5 |
| 5,971,046 A | 10/1999 | Koch et al. | 152/152.1 |
| 6,117,927 A * | 9/2000 | Toba et al. | 524/261 |
| 6,172,160 B1 | 1/2001 | Nakamura et al. | |
| 6,194,505 B1 | 2/2001 | Sone et al. | 524/432 |
| 6,197,888 B1 | 3/2001 | Luo | 525/247 |
| 6,255,416 B1 | 7/2001 | Sone et al. | 526/153 |
| 6,291,591 B1 | 9/2001 | Luo | 525/191 |
| 6,303,692 B1 | 10/2001 | Luo | 525/191 |
| 6,699,813 B2 | 3/2004 | Luo et al. | 502/119 |
| 6,759,497 B2 | 7/2004 | Grun et al. | |
| 6,838,526 B1 | 1/2005 | Sone et al. | |
| 6,897,270 B2 | 5/2005 | Ozawa et al. | 526/88 |
| 6,977,281 B1 | 12/2005 | Ozawa et al. | 525/377 |
| 6,992,147 B1 | 1/2006 | Ozawa et al. | 525/342 |
| 7,008,899 B2 | 3/2006 | Luo et al. | 502/131 |
| 7,094,849 B2 | 8/2006 | Luo et al. | 526/164 |
| 7,351,776 B2 | 4/2008 | Tartamella et al. | |

(Continued)

FOREIGN PATENT DOCUMENTS

DE 138 070 10/1979

(Continued)

OTHER PUBLICATIONS

Z. Shen, J. Ouyang, F. Wang, Z. Hu, F. Yu, and B. Qian, Journal of Polymer Science: Polymer Chemistry Edition, 1980, vol. 18, pp. 3345-3357.

(Continued)

*Primary Examiner*—Ling-Siu Choi
(74) *Attorney, Agent, or Firm*—Meredith E. Hooker; Arthur Reginelli

(57) ABSTRACT

A method for preparing a functionalized polymer comprising the steps of preparing a pseudo-living polymer by polymerizing conjugated diene monomer with a lanthanide-based catalyst, and reacting the pseudo-living polymer with at least one functionalizing agent defined by the formula (I)

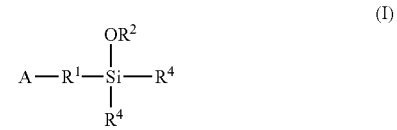

where A is a substituent that will undergo an addition reaction with a pseudo-living polymer, $R^1$ is a divalent organic group, $R^2$ is a monovalent organic group, and each $R^4$, which may be the same or different, is a monovalent organic group or a substituent defined by $-OR^5$ where $R^5$ is a monovalent organic group, with the proviso that A, $R^1$, $R^2$, $R^4$, and $R^5$ are substituents that will not protonate a pseudo-living polymer. Also, the functionalized polymer and a vulcanizable composition containing the polymer.

20 Claims, No Drawings

U.S. PATENT DOCUMENTS

| | | | |
|---|---|---|---|
| 2004/0147694 A1 | 7/2004 | Sone et al. | 526/164 |
| 2006/0004131 A1 | 1/2006 | Ozawa et al. | 525/342 |
| 2006/0025539 A1 | 2/2006 | Ozawa et al. | 525/377 |
| 2007/0149717 A1 | 6/2007 | Luo et al. | |

FOREIGN PATENT DOCUMENTS

| | | |
|---|---|---|
| EP | 0 767 179 | 4/1997 |
| EP | 0 713 885 | 5/1998 |
| EP | 0 863 165 | 9/1998 |
| EP | 0 894 825 | 2/1999 |
| EP | 0 920 886 | 6/1999 |
| EP | 0 957 115 | 11/1999 |
| EP | 1 099 711 | 11/1999 |
| GB | 835752 | 7/1956 |
| JP | 10-306113 A | 11/1998 |
| JP | 11-035633 A | 2/1999 |
| JP | 05-051406 A | 2/2005 |
| JP | 05-59103 A | 3/2005 |
| WO | 95/04090 | 2/1995 |
| WO | 01/34659 | 5/2001 |
| WO | 02/38615 | 5/2002 |

OTHER PUBLICATIONS

H.L. Hsieh, H.C. Yeh, Rubber Chemistry and Technology, 1985, vol. 58, pp. 117-145.

D.J. Wilson, Journal of Polymer Science, Part A, Polymer Chemistry, 1995, vol. 33, pp. 2505-2513.

R.P. Quirk, A.M. Kells, Poymer International, 2002 vol. 49, pp. 751-756.

"Chemical Modification of Neodymium High cis-1,4-Polybutadiene with Styreneoxide" by Hattori et al., J. Elastomers and Plastics, Issue 23, 135, 1991.

"Functionalization with Styreneoxide" by Hattori et al., Polym. Adv. Techol., Issue 4, 450 1993.

* cited by examiner

MODIFIED POLYMERS PREPARED WITH LANTHANIDE-BASED CATALYSTS

This application is a continuation of U.S. application Ser. No. 10/296,084, filed Aug. 14, 2003 now U.S. Pat. No. 6,992,147, which gains priority from International Application No. PCT/US00/30743, filed on Nov. 10, 2000, which gains priority from U.S. patent application Ser. No. 60/165,172, filed Nov. 12, 1999.

FIELD OF THE INVENTION

This invention relates to functionalized polymers and processes for functionalizing these polymers. More particularly, the polymers are prepared with a lanthanide-based catalyst system and functionalized with certain functionalizing agents. Specifically, these functionalizing agents contain a alkoxysilane substituent that provides technologically useful benefits.

BACKGROUND OF THE INVENTION

Conjugated diene polymers are commonly used in the rubber industry. These polymers are often prepared by using coordination-catalysis techniques because the microstructure of the resulting polymer can be controlled. Polybutadiene having greater than 90 percent of its units in the 1,4-cis configuration can be produced with a coordination catalyst system that includes a nickel, cobalt, or titanium compound, an alkylating agent, and a halogen source. Polymers having this microstructure have a low glass transition temperature ($T_g$), which provides good low-temperature properties. Also, high 1,4-cis polymers have excellent wear resistance and mechanical properties such as reduced cut growth.

The tire industry has been challenged to design tires that have improved rolling resistance, which contributes to better fuel efficiency. Attempts to improve rolling resistance have included alternate tire designs and the use of rubber that has less hysteresis loss. Also, there has been a general trend toward the use of silica as a reinforcing filler. Polymers that interact with the fillers of tires have demonstrated less hysteresis loss.

Functionalized polymers prepared with anionic polymerization techniques have demonstrated lower hysteresis loss. They can be functionalized both at initiation and termination. Polybutadiene has been produced by initiating polymerization of 1,3-butadiene with functionalized initiators to provide polymers that have a greater affinity toward carbon black or silica fillers. Anionically polymerized polymers have also been terminated with functionalized terminators to provide polymers that have a greater affinity toward silica fillers. Unfortunately because anionic polymerization does not provide strict control over the polymer microstructure, high 1,4-cis polymers are not obtained.

Coordination catalysis limits the ability to functionalize the resulting polymers because they operate by chemical mechanisms that involve the interaction of several chemical constituents, and often also involve self-termination reactions. As a result, the reaction conditions required to achieve functionalization are difficult to obtain.

Terminating agents, such as organo metal halides, heterocumulene compounds, three-membered heterocyclic compounds, and certain other halogen containing compounds, will react with polymers prepared with a Lanthanide-based catalyst system. The resulting functionalized polymers, however, do not have a useful enough affinity toward either silica or carbon black fillers. And, in general they do not alleviate the cold flow problems associated with neodymium produced polymers.

Therefore, there is a need in the art to provide functionalizing agents that will react with polymers prepared with coordination catalysts to yield functionalized polymers having a high cis microstructure and an affinity toward silica.

SUMMARY OF INVENTION

In general the present invention provides a method for preparing a functionalized polymer comprising the steps of preparing a pseudo-living polymer by polymerizing conjugated diene monomer with a lanthanide-based catalyst, and reacting the pseudo-living polymer with at least one functionalizing agent defined by the formula (I)

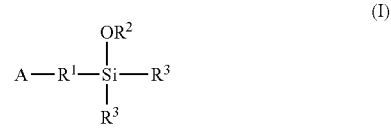

(I)

where A is a substituent that will undergo an addition reaction with a pseudo-living polymer, $R^1$ is a divalent organic group, each $R^2$, which may be the same or different, is a monovalent organic group, and each $R^4$, which may be the same or different, is a monovalent organic group or a substituent defined by $-OR^2$ and with the proviso that A, $R^1$, $R^2$, and $R^3$, are substituents that will not protonate a pseudo-living polymer.

The present invention also includes a functionalized polymer prepared by a process comprising the steps of preparing a pseudo-living polymer by polymerizing conjugated monomer with a lanthanide-based catalyst, and reacting the pseudo-living polymer with a functionalizing agent defined by the formula (I)

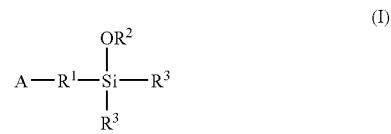

(I)

where A is a substituent that will undergo an addition reaction with a pseudo-living polymer, $R^1$ is a divalent organic group, each $R^2$, which may be the same or different, is a monovalent organic group, and each $R^4$, which may be the same or different, is a monovalent organic group or a substituent defined by $-OR^2$ and with the proviso that A, $R^1$, $R^2$, and $R^3$, are substituents that will not protonate a pseudo-living polymer.

The present invention further provides a functionalized polymer defined by the formula (XI)

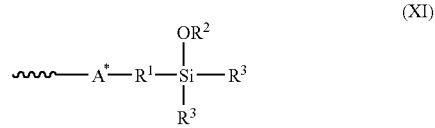

(XI)

where $R^1$, $R^2$, and $R^3$ are as defined above, A* is the residue of a substituent that has undergone an addition reaction with a pseudo-living polymer, and ⁓⁓⁓ is polymer having a cis microstructure that is greater than about 85%, a 1,2- or 3,4-unit content that is less than about 3%, and a molecular weight distribution that is less than about 5.

The present invention also provides a vulcanizable composition of matter comprising a rubber component comprising at least one functionalized polymer defined by the formula (XI)

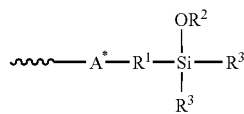
(XI)

where $R^1$, $R^2$, and $R^3$ are as defined above, $A^*$ is the residue of a substituent that has undergone an addition reaction with a pseudo-living polymer, and ⁓⁓⁓ is polymer having a cis microstructure that is greater than about 85%, a 1,2- or 3,4-unit content that is less than about 3%, and a molecular weight distribution that is less than about 5.

The present invention also provides a vulcanizable composition of matter comprising a rubber component comprising a functionalized polymer prepared by a process comprising the steps of preparing a pseudo-living polymer by polymerizing conjugated monomer with a lanthanide-based catalyst, and reacting the pseudo-living polymer with a functionalizing agent defined by the formula (I)

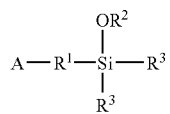
(I)

where A is a substituent that will undergo an addition reaction with a pseudo-living polymer, $R^1$ is a divalent organic group, each $R^2$, which may be the same or different, is a monovalent organic group, and each $R^4$, which may be the same or different, is a monovalent organic group or a substituent defined by —$OR^2$ and with the proviso that A, $R^1$, $R^2$, and $R^3$, are substituents that will not protonate a pseudo-living polymer, and a reinforcing filler including an inorganic filler.

The present invention further provides a vulcanizable composition of matter comprising a rubber component comprising at least one functionalized polymer prepared by a process comprising the steps of preparing a pseudo-living polymer by polymerizing conjugated diene monomer with a lanthanide-based catalyst, and reacting the pseudo-living polymer with at least one functionalizing agent defined by the formula (I)

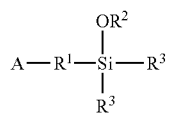
(I)

where A is a substituent that will undergo an addition reaction with a pseudo-living polymer, $R^1$ is a divalent organic group, each $R^2$, which may be the same or different, is a monovalent organic group, and each $R^4$, which may be the same or different, is a monovalent organic group or a substituent defined by —$OR^2$ and with the proviso that A, $R^1$, $R^2$, and $R^3$, are substituents that will not protonate a pseudo-living polymer.

DETAILED DESCRIPTION OF ILLUSTRATIVE EMBODIMENTS

The present invention is directed toward novel functionalizing agents, a process for functionalizing polymers prepared with lanthanide-based catalysts, the resulting functionalized polymers, and the use of these functionalized polymers within tires.

The polymers that are functionalized are prepared from lanthanide-based coordination catalyst systems. These polymers are preferably characterized in that greater than about 85 percent of the polymer is in the cis microstructure, less than about 3% of the polymer is in the 1,2- or 3,4-microstructure, and molecular weight distribution of the polymer is less than about 4. Because these polymers have been found to demonstrate some living characteristics, they may be called pseudo-living polymers within this specification.

This invention is not limited to functionalizing a polymer prepared from any particular lanthanide-based catalyst. One useful catalyst includes a lanthanide compound, an alkylating agent, and a source of halogen. The lanthanide compound can include neodymium (Nd) carboxylates including Nd neodecanoate. Also, the lanthanide compound can include the reaction product of a Nd carboxylate and a Lewis base such as acetylacetone. The alkylating agents can generally be defined by the formula $AlR_3$, where each R, which may the same or different, is hydrogen, a hydrocarbyl group, or an alkyl aluminoxy group, with the proviso that at least one R is a hydrocarbyl group. Examples of these alkylating agents include, but are not limited to, trialkyl aluminum, dialkyl aluminum hydride, alkyl aluminum dihydride, and mixtures thereof. Examples of alkylating agents where R is an alkyl aluminoxy group include methyl aluminoxanes. Sources of halogen can include organoaluminum chloride compounds. Catalyst systems that generally include lanthanide compounds and alkylating agents definable by the formula $AlR_3$ are disclosed in U.S. Pat. Nos. 3,297,667, 3,541,063, and 3,794,604, which are incorporated herein by reference.

One particularly preferred catalyst includes (a) the reaction product of Nd carboxylate and acetylacetone, (b) triisobutylaluminum, diisobutylaluminum hydride, isobutylaluminum dihydride, or a mixture thereof, and (c) diethylaluminum chloride, ethylaluminum dichloride, or mixtures thereof. This catalyst system is disclosed in U.S. Pat. No. 4,461,883, which is incorporated herein by reference. Another preferred catalyst includes (a) Nd neodecanoate, (b) triisobutylaluminum, diisobutylaluminum hydride, isobutylaluminum dihydride, or a mixture thereof, and (c) diethylaluminum chloride, ethylaluminum dichloride, or mixtures thereof. This catalyst system is disclosed in Can. Pat. No. 1,223,396, which is incorporated herein by reference.

Still another preferred lanthanide-based catalyst system includes (a) a lanthanide compound such as Nd carboxylate, (b) an aluminoxane such as methyl aluminoxane, which may optionally be used in conjunction with an alkylating agent such as diisobutylaluminum hydride, and (c) a source of halogen such as diethylaluminum chloride. Neodymium catalysts that include alkyl aluminoxane compounds are described in Japanese Kokai publications 06-211916, 08-073515, 10-306113, and 11-035633, which are incorporated herein by reference. In an especially preferred embodiment of the system with aluminoxanes, the source of halogen is a metal halide of Group I, II, or VII metals. These metal halides include, but are not limited to, $BeCl_2$, $BeBr_2$, $BeI_2$, MgCl$_2$, MgBr$_2$, MgI$_2$, CaCl$_2$, CaBr$_2$, CaI$_2$, BaCl$_2$, BaBr$_2$, BaI$_2$, ZnCl$_2$, ZnBr$_2$, ZnI$_2$, CdCl$_2$, HgCl$_2$, MnCl$_2$, ReCl$_2$, CuCl$_2$, AgCl$_2$, AuCl. Other lanthanide-based catalysts and processes for their use are described in U.S. Pat. Nos. 4,444,903, 4,525,549, 4,699,960, 5,017,539, 5,428,119, 5,064,910, and 5,844,050, which are incorporated herein by reference.

Typically, from about 0.0001 to about 1.0 mmol of lanthanide metal are employed per 100 grams of monomer. More preferably, from about 0.001 to about 0.75, and even more preferably from about 0.005 to about 0.5 mmol of lanthanide metal per 100 grams of monomer are employed. The ratio of alkylating agent to lanthanide metal is from about 1:1 to about 1:500, more preferably from about 3:1 to about 250:1, and even more preferably from about 5:1 to about 200:1. The ratio of halogen source to lanthanide metal is from about 0.1:1 to about 30:1, more preferably from about 0.2:1 to about 15:1, and even more preferably from about 1:1 to about 10:1.

Monomers that are polymerized by the lanthanide-based catalysts are conjugated diene monomers that include, but are not limited to, 1,3-butadiene, isoprene, 1,3-pentadiene, 2,3-dimethyl-1,3-butadiene, and myrcene. 1,3-butadiene is most preferred. These conjugated dienes may be used either alone or in combination. If desired, a small amount of monomer other than conjugated dienes can be added. These other monomers include, but are not limited to, aromatic vinyl compounds such as styrene. The amount of the copolymerizable monomer is not limited, but is usually less than 10 percent by weight (pbw) preferably less than 5 pbw, and even more preferably less than about 3 pbw of the entire polymer.

According to the present invention, pseudo-living polymers prepared with lanthanide-based catalysts are reacted with certain functionalizing agents to produce terminally-functionalized polymers. Functionalizing agents that can be used include those generally defined by the formula (I)

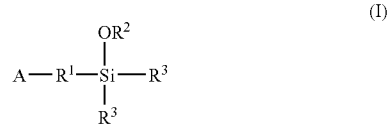
(I)

where A is a substituent that will undergo an addition reaction with a pseudo-living polymer, R$^1$ is a divalent organic group, each R$^2$, which may be the same or different, is a monovalent organic group, and each R$^3$, which may be the same or different, is a monovalent organic group or a substituent defined by —OR$^2$ and with the proviso that A, R$^1$, R$^2$, and R$^3$, are substituents that will not protonate a pseudo-living polymer. Preferably, at least one R$^3$ is —OR$^2$, and even more preferably each R$^3$ is —OR$^2$. As used throughout this specification, substituents that will not protonate a pseudo-living polymer refer to those substituents that will not donate a proton to the polymer in a protolysis reaction.

Preferably, the divalent organic groups are hydrocarbylene groups that contain from 0 to about 20 carbon atoms. More preferably, the hydrocarbylene groups will contain from about 1 to about 10 carbon atoms, and even more preferably from about 2 to about 8 carbon atoms. Those skilled in the art will appreciate that in the case where the hydrocarbylene group contains 0 carbon atoms, the group simply represents a single bond between the silicon atom and the group A. Suitable hydrocarbylene groups include, but are not limited to, alkylene, cycloalkylene, substituted alkylene, substituted cycloalkylene, alkenylene, cycloalkenylene, substituted alkenylene, substituted cycloalkenylene, arylene, and substituted arylene. The term "substituted" refers to an organic group, such as a hydrocarbyl group, that replaces a hydrogen atom attached to a carbon within the group. The hydrocarbylene groups may contain hetero atoms such as nitrogen (N), oxygen (O), sulfur (S), phosphorus (P), and silicon (Si). When these hydrocarbylene groups include O, they may be referred to as oxo-hydrocarbylene groups, or where they include N, they may be referred to as aza-hydrocarbyl-hydrocarbylene groups.

Some specific examples of hydrocarbylene groups include methylene, ethylene, 1,3-propylene, 1,2-propylene, 1,4-butylene, 1,4-(2-methyl)butylene, 1,5-pentylene, cyclopentylene, and phenylene groups.

Preferably, the monovalent organic groups include hydrocarbyl groups that contain from 1 to about 20 carbon atoms. More preferably, these groups will include from about 2 to about 10 carbon atoms, and even more preferably from about 3 to about 8 carbon atoms. These hydrocarbyl groups can include, but are not limited to, alkyl, cycloalkyl, substituted alkyl, substituted cycloalkyl, alkenyl, cycloalkenyl, substituted alkenyl, substituted cycloalkenyl, aryl, substituted aryl, allyl, aralkyl, alkaryl, and alkynyl, and may contain hetero atoms such as N, O, S, P, and Si. When these hydrocarbyl groups include O, they may be referred to as oxo-hydrocarbyl groups, or where they include N, they may be referred to as aza-hydrocarbyl-hydrocarbyl groups.

Some specific examples of hydrocarbyl groups include methyl, ethyl, propyl, isopropyl, butyl, 2-methylbutyl, pentyl, hexyl, cyclohexyl, heptyl, octyl, cyclo-octyl, 2-ethylhexyl, and 2-propylhexyl groups.

In addition to the monomeric alkoxysilane functionalizing agents that are generally represented by formula (I), dimers, trimers, or even larger oligomers of these compounds can be employed because these structures are likely to form in basic or acidic conditions or in the presence of condensation catalysts such as diorganotin dicarboxylate. For example, dimers of the compounds represented by the formula (I) can be represented by the following formula

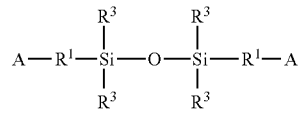

Reference to a monomeric alkoxysilane functionalizing agent will likewise refer to the oligomers thereof. In the event that R$^3$ is OR$^2$, it may likewise couple with another functionalized polymer.

Substituents that will undergo an addition reaction with a pseudo-living polymer, and are therefore examples of substituent A, include epoxy groups, esters, imines including dihydroimidazoles, isocyanates, isothiocyanates, ketones, and imides including isocyanulate groups.

In one embodiment, where A contains an epoxy group, functionalizing agents of the present invention can be defined by the formula (II)

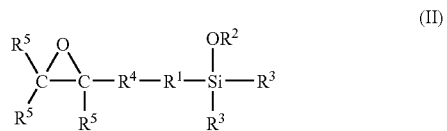
(II)

where $R^1$, $R^2$, and $R^3$ are as defined above, $R^4$ is a divalent organic group or trivalent organic group where it forms a cyclic structure with $R^5$, and each $R^5$, which may be the same or different, is a hydrogen atom, a monovalent organic group, or a divalent organic group in the case where $R^4$ may form a cyclic structure with a $R^5$ group, or two $R^5$ groups may form a cyclic structure. $R^1$, $R^2$, $R^3$, $R^4$, and $R^5$ are substituents that will not protonate a pseudo-living polymer. The monovalent and divalent organic groups are as defined above.

Non-limiting examples of reactive epoxy groups include epoxy ethyl, epoxy propyl, methyl epoxy propyl, epoxy butyl, methyl epoxy butyl, epoxy pentyl, epoxy cyclohexyl, epoxy cycloheptyl, epoxy octyl, glycidoxypropyl, glycidoxybutyl, and glycidoxypentyl.

Specific non-limiting examples of epoxy-containing functionalizing agents definable by the formula (II) include 3-glycidoxypropyltrimethoxysilane (GPMOS), 2-(3,4-epoxycyclohexyl)ethyltrimethoxysilane (ECMOS), 3-(trimethoxysilyl)propyl methacrylate, 3-glycidoxypropyl methyldiethoxysilane, 2-(3,4-epoxycyclohexyl) ethyltriethoxysilane, 2-(3,4-epoxycyclohexyl) ethyltriisopropoxysilane, 2-(3,4-epoxycyclohexyl) ethyltriphenoxysilane, (2-(3,4-epoxycyclohexyl)ethyl) methyldimethoxysilane, (2-(3,4-epoxycyclohexyl)ethyl)methyldiethoxysilan, (2-(3,4-epoxycyclohexyl)ethyl)ethyldiethoxysilane, (2-(3,4-epoxycyclohexyl)ethyl)methyldiphenoxysilane, 3-glycidoxypropyltriethoxysilane, 3-glycidoxypropyltriisopropoxysilane, 3-glycidoxypropyltriphenoxysilane, (3-glycidoxypropyl)methyldimethoxysilane, (3-glycidoxypropyl) ethyldiethoxysilane, (3-glycidoxypropyl) methyldiphenoxysilane, partial condensation products of 2-(3,4-epoxycyclohexyl)ethyltrimethoxysilane, partial condensation products of 2-(3,4-epoxycyclohexyl) ethyltriethoxysilane, partial condensation products of 2-(3,4-epoxycyclohexyl)ethyltriisopropoxysilane, partial condensation products of 2-(3,4-epoxycyclohexyl)ethyltriphenoxysilane, partial condensation products of 3-glycidoxypropyltrimethoxysilane, partial condensation products of 3-glycidoxypropyltriethoxysilane, partial condensation products of 3-glycidoxypropyltriisopropoxysilane, partial condensation products of 3-glycidoxypropyltriphenoxysilane.

In another embodiment, where A contains an ester group, functionalizing agents of the present invention can be defined by the formulas (III) and (IV)

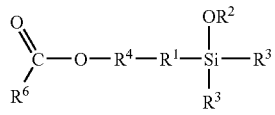

(III)

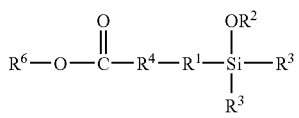

(IV)

where $R^1$, $R^2$, $R^3$, and $R^4$ are as defined above, and $R^6$ is a monovalent organic group, or, in the case where $R^4$ combines with $R^6$ to form a cyclic group, $R^6$ may be a divalent organic group and $R^4$ will be a trivalent organic group, with the proviso that these substituents will not protonate a pseudo-living polymer. The monovalent and divalent organic groups are as defined above.

Non-limiting examples of ester groups include α,β-unsaturated esters, methacrylic acid esters, and acrylic acid esters.

Specific non-limiting examples of ester-containing functionalizing agents definable by the formulas (III) and (IV) include 3-(trimethoxysilyl)propyl methacrylate, 3-(meth)acryloyloxypropyltrimethoxysilane (MPMOS), 3-(meth)acryloyloxypropyltriethoxysilane, 3-(meth)acryloyloxypropyltriisopropoxysilane, 3-(meth)acryloyloxypropyltriphenoxysilane, (3-(meth)acryloyloxypropyl)methyldimethoxysilane, (3-(meth)acryloyloxypropyl)methyldiethoxysilane, (3-(meth)acryloyloxypropyl)ethyldiethoxysilane, (3-(meth)acryloyloxypropyl)methyldiphenoxysilane, partial condensation products of 3-(meth)acryloyloxypropyltrimethoxysilane, partial condensation products of 3-(meth)acryloyloxypropyltriethoxysilane, partial condensation products of 3-(meth)acryloyloxypropyltriisopropoxysilane, partial condensation products of 3-(meth) acryloyloxypropyltriphenoxysilane.

In another embodiment, where A contains an imine group, the functionalizing agent of the present invention can be defined by the formula (V) or formula (VI)

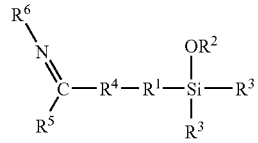

(V)

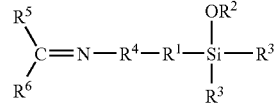

(VI)

where $R^1$, $R^2$, $R^3$, $R^4$, $R^5$ and $R^6$ are as defined above, with the proviso that in formula (V), at least one of $R^4$ or $R^5$ is attached to the imine carbon via a carbon atom, and $R^6$ is attached to the imine nitrogen via a carbon atom. In formula (VI), at least one of $R^5$ or $R^6$ is attached to the imine carbon via a carbon atom, and $R^4$ is attached to the imine nitrogen via a carbon atom. $R^4$ may combine with $R^5$ or $R^6$ to form a cyclic group, or $R^5$ may combine with $R^6$ to form a cyclic group. All R groups are substituents that will not protonate a pseudo-living polymer. The mono- and divalent organic groups are as defined above.

Specific non-limiting examples of imine groups include alkylene amines, benzylideneamines, and imidazoles including 4,5-dihydroimidazoles.

Specific non-limiting examples of imine containing functionalizing agents definable by the formula (V) or (VI) include N-(3-triethoxysilylpropyl)-4,5-dihydroimidazole (TEOSI) and N-(1,3-dimethylbutylidene)-(3-triethoxysilyl)-1-propaneamine (HAPEOS).

In another embodiment, where A contains a ketone group, functionalizing agents of the present invention can be defined by the formula (VII)

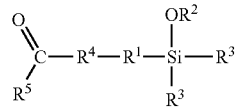

(VII)

where $R^1$, $R^2$, $R^3$, $R^4$, and $R^5$ are as defined above, $R^4$ may combine with $R^5$ to form a cyclic group and where these substituents will not protonate a pseudo-living polymer. The monovalent and divalent organic groups are as defined above.

A non-limiting example of a ketone group includes benzophenone. Specific non-limiting examples of ketone-containing functionalizing agents definable by the formula (VII) include 4-(3-(triethoxysilyl)propoxy)benzophenone, 4-(3-(triethoxysilyl)ethyl)benzophenone, 4,4'-bis((3-triethoxysilyl)propoxy)benzophenone, 4-(3-trimethoxysilyl)propoxybenzophenone, and 4,4'-bis((3-trimethoxysilyl)propoxy)benzophenone.

In another embodiment, where A contains an isocyanate or isothiocyanate group, functionalizing agents of the present invention can be defined by the formula (VIII)

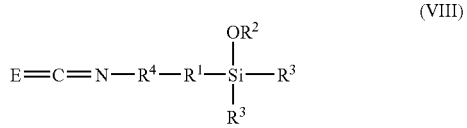

(VIII)

where $R^1$, $R^2$, $R^3$, and $R^4$ are as defined above, and where E is O or S, with the proviso that these substituents will not protonate a pseudo-living polymer. The monovalent and divalent organic groups are as defined above.

Non-limiting examples of isocyanate groups include (2-isocyanato) ethyl, (3-isocyanato)propyl, (4-isocyanato) butyl, and (5-isocyanato)pentyl groups. The isothiocyanato equivalents of the foregoing groups are also suitable.

Specific non-limiting examples of isocyanate-containing functionalizing agents definable by the formula (VIII) include 3-isocyanatopropyltrimethoxysilane, 3-isocyanatopropyltriethoxysilane (IPMOS), 3-isocyanatopropyltriisopropoxysilane, 3-isocyanatopropyltriphenoxysilane, (3-isocyanatopropyl)methyldimethoxysilane, (3-isocyanatopropyl)methyldiethoxysilane, (3-isocyanatopropyl)ethyldiethoxysilane, (3-isocyanatopropyl)methyldiphenoxysilane, partial condensation products of 3-isocyanatopropyltrimethoxysilane, partial condensation products of 3-isocyanatopropyltriethoxysilane, partial condensation products of 3-isocyanatopropyltriisopropoxysilane, partial condensation products of 3-isocyanatopropyltriphenoxysilane. Examples of isothiocyanate-containing functionalizing agents include the isothiocyanate equivalents of the foregoing isocyanate compounds.

In another embodiment, where A contains an amide group, functionalizing agents of the present invention can be defined by the formula (IX) or (X)

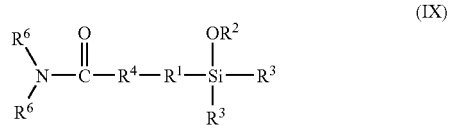

(IX)

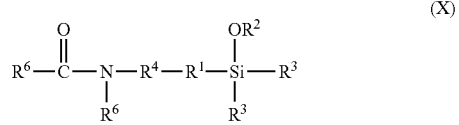

(X)

where $R^1$, $R^2$, $R^3$, $R^4$, and $R^6$ are as defined above. $R^4$ may combine with either $R^6$ to form a cyclic group, or two $R^6$ groups may combine to form a cyclic group. These substituents will not protonate a pseudo-living polymer. The monovalent and divalent organic groups are as defined above.

Non-limiting examples of amide groups include N-alkylisocyanulates, 3-(N,N-dialkylamido) propyl, trihydrocarbyl isocyanulate group, 3-(N,N-dihydrocarbylamido)alkyl group, N-hydrocarbylcaprolactam group, N-hydrocarbylpyrrolidone groups, and N,N-dialkylimidazolidione groups.

Specific non-limiting examples of amide-containing functionalizing agents definable by the formulas (IX) or (X) include tris(3-trimethoxysilylpropyl) isocyanulate, N-(3-trimethoxysilylpropyl) caprolactam, N-(3-trimethoxysilylpropyl)pyrrolidone, tris(3-triethoxysilylpropyl) isocyanulate (TMOSPI),-(3-triethoxysilylpropyl)caprolactam, and N-(3-triethoxysilylpropyl)pyrrolidone.

Epoxy compounds that will not protonate a pseudo-living polymer can be used in combination with the foregoing functionalizing agents to react with pseudo-living polymers to form blends of functionalized polymers. These epoxy compounds include, but are not limited to, styrene oxide, epoxydized soy bean oil, glycidyl (meth)acrylate, diglycidyl ether, ethylene oxide, propylene oxide, 1,2-epoxybutane, 1,2-epoxyisobutane, 2,3-epoxybutane, 1,2-epoxyhexane, 1,2-epoxyoctadecane, 1,2-epoxyeicosane, 1,2-epoxy-2-pentylpropane, 3,4-epoxy-1-butene, 1,2-epoxy-5-hexene, 1,2-epoxy-9-decene, 1,2-epoxycyclopentane, 1,2-epoxycyclohexane, 1,2-epoxycyclododecane, 1,2-epoxyethylbenzene, 1,2-epoxy-1-methoxy-2-methylpropane, glycidyl methyl ether, glycidyl ethyl ether, glycidyl isopropyl ether, glycidyl phenyl ether, glycidyl butyl ether, ethyleneglycol diglycidyl ether, neopentylglycol diglycidyl ether, trimethylolpropane triglycidyl ether, glycerol triglycidyl ether, polypropyleneglycol diglycidyl ether, polyethyleneglycol diglycidyl ether, sorbitol polyglycidyl ether, N,N-diglycidylaniline, N,N-diglycidyltoluidine, N,N-diglycidyl-3-glycidoxyaniline, N,N-diglycidyl-2-glycidoxyaniline, bis(N,N-diglycidylamino)diphenylmethane, tris(2,3-epoxypropyl) isocyanulate, N,N-diglycidylbutylamine, and mixtures thereof. Reference to any silane-containing functionalizing agents refers also to the condensation products of two or more kinds of silane-containing functionalizing agents.

Many of the functionalizing agents described herein are commercially available from chemical manufacturers such as Witco Chemical Corp., GE Silicone, Aldrich Chemical, Gelest, Inc., and Chisso Corp. of Japan. Alternatively, those skilled in the art can readily prepare these compounds by using conventional procedures. For example, the alkoxysilane compounds of this invention can be prepared by reacting an alcohol or a metal alkoxide with organosilicon halides. Organosilicon halides may be obtained reacting organometallic compounds, such as Grignard reagents or organolithium compounds, with silicon multi-halides ($SiCl_4$, $MeSiCl_3$), or by hydrosilation of olefinic compounds by halosilane compounds ($HSiCl_3$ or $HMeSiCl_2$).

The functionalized polymers of this invention are prepared by contacting one or more of the foregoing functionalizing agents, including mixtures thereof, with a pseudo-living polymer. If a solvent is employed, it is preferred to employ a solvent in which both the pseudo-living polymer and the functionalizing agent are soluble, or in which they may both be suspended. Preferably, this contacting takes place at a temperature of less than 160° C., and more preferably at a temperature from about 20° C. to about 130° C. Further, the reaction time is preferably from about 0.1 to about 10 hours, and more preferably from about 0.2 to about 5 hours.

The amount of functionalizing agent used can vary. Preferably, from about 0.01 to about 200 moles of functionalizing agent per mole of lanthanide are employed, and more preferably, from about 0.1 to about 150 moles per mole of lanthanide.

The reaction between the pseudo-living polymer and the functionalizing agent is quenched by using reagents such as, but not limited to, isopropyl alcohol, methanol, and water. Stabilizers, such as 2,6-di-tert-butyl-4-methylphenol (BHT), can be added during or after quenching.

In lieu of or before quenching the resulting polymer, however, certain reactive compounds can be added to provide additional functionality to the polymer. These reactive compounds include those that will undergo addition reactions with metal alkoxides or metal amides. It is believed that metal alkoxides, or similar carbon-oxygen metal bonds, are produced when the compounds of formulas (II), (III), (IV), and (VII) are reacted with a pseudo-living polymer, where the metal is Al or Nd. Addition of a protic quenching agent is believed to remove the metal via a substitution reaction and thereby leave a hydroxyl group at the polymer chain end. A reaction between the metal alkoxide, or similar carbon-oxygen metal bonds, and the metal alkoxide-reactive compound before quenching is believed to provide additional functionality. For example, epoxy compounds will react with a metal alkoxide to form polyalkylene oxides. Some useful epoxy compounds include ethylene oxide and propylene oxide.

The polymer product can be recovered by using any technique that is commonly employed in the art. For example, the polymer product can be coagulated in a hindered solvent such as isopropyl alcohol, and then dried in a hot air oven or hot mill. Alternatively, the polymer product can be recovered by steam desolventization and successive hot air drying or drying on a hot mill. A processing oil can be added prior to finishing.

The resulting functionalized polymer can be represented by the formula (XI)

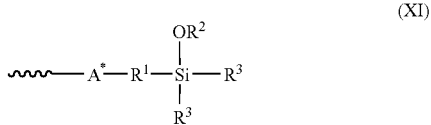

(XI)

where $R^1$, $R^2$, and $R^3$ are as defined above, A* is the residue of a substituent that has undergone an addition reaction with a pseudo-living polymer, and ⁓⁓ is polymer having a cis microstructure greater than about 85%, a vinyl content less than about 2%, and a molecular weight distribution that is less than about 5. More preferably, the polymer has a cis microstructure that is greater than about 90% a vinyl content that is less than about 1.5%, and a molecular weight distribution that is less than about 4.

A* is the reaction product of substituent A, a pseudo-living polymer, and optionally a quenching agent, as well as any additional reagents added prior to quenching. Where the substituent A of the functionalizing agent contains a reactive epoxy group, the reaction of this functionalizing agent and a pseudo-living polymer will und ergo a ring-opening addition reaction, which leads to the formation of a metal alkoxy group.

Polymers carrying alkoxysilane functionality may couple via a condensation reaction. For example, polymers represented by the formula (XI) may condense to form a coupled polymer that is represented by the following formula (XII)

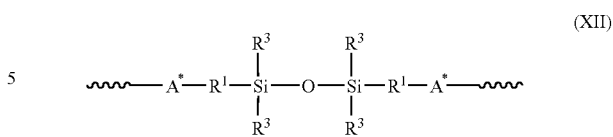

(XII)

where $R^1$ and $R^3$ are as defined above.

Reference to the functionalized polymers will likewise include the condensation products thereof. In the event that any $R^4$ is $OR^5$, it may likewise couple with another functionalized polymer. Advantageously, the coupling of these functionalized polymers improves the cold flow resistance of the polymer.

The functionalized polymers of this invention can advantageously be used in the manufacture of various tire components including, but not limited to, tire treads, side walls, subtreads, and bead fillers. They can be used as all or part of the elastomeric component of a tire stock. In one embodiment, the functionalized polymers comprise greater than about 10 pbw, more preferably, greater than about 20 pbw, and even more preferably greater than about 30 pbw, of the elastomeric component of a tire stock. Addition of the functionalized polymers to a tire stock does not alter the type or amount of other ingredients typically included within these vulcanizable compositions of matter. Accordingly, practice of this invention is not limited to any particular vulcanizable composition of matter or tire compounding stock.

Typically, tire stocks include an elastomeric component or rubber that is blended with reinforcing fillers and at least one vulcanizing agent. Accelerators, oils, waxes, fatty acids and processing aids are often included. Vulcanizable compositions of matter containing synthetic rubbers typically include antidegradants, processing oils, zinc oxide, optional tackifying resins, optional reinforcing resins, optional peptizers, and optional scorch inhibiting agents.

The functionalized polymers of this invention may be used in conjunction with other rubbers to form the elastomeric component of a tire stock. These other rubbers may include natural rubber, synthetic rubber, or both. Examples of synthetic rubber include synthetic poly(isoprene), poly(styrene-co-butadiene), poly(butadiene), poly(styrene-co-butadiene-co-isoprene) and mixtures thereof.

Reinforcing fillers may include both organic and inorganic fillers. Organic fillers include, but are not limited to carbon black, and inorganic fillers include, but are not limited to, silica, alumina, aluminum hydroxide, and magnesium hydroxide. Reinforcing fillers are typically employed in an amount from about 1 to about 100 parts by weight per 100 parts by weight rubber (phr), and preferably from about 20 to about 80 parts by weight phr, and more preferably from about 40 to about 80 parts by weight phr based on the total weight of all reinforcing fillers employed. Typically, when an inorganic filler is used, it is used in combination with organic fillers. In these embodiments, the total amount of reinforcing filler will include from about 30 to about 99 parts by weight inorganic filler and 1 to about 70 parts by weight organic filler, based on 100 parts by weight total filler. More preferably, the total filler will include from about 50 to about 95 parts by weight inorganic filler and from about 5 to about 50 parts by weight organic filler based on 100 parts by weight filler.

Carbon blacks may include any commonly available carbon black, but those having a surface area (EMSA) of at least 20 m²/g, and more preferably at least 35 m²/g up to 200 m²/g or higher, are preferred. Surface area values used in this application are those determined by ASTM test D-1765 by using the cetyltrimethyl-ammonium bromide (CTAB) technique.

Silicas (silicon dioxide) are generally referred to as wet-process, hydrated silicas because they are produced by a chemical reaction in water, and precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 m$^2$/g, preferably about 100 to about 250 m$^2$/g, and more preferably about 150 to about 220 m$^2$/g. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pa.). Useful commercial grades of different silicas are also available from other sources including Rhone Poulenc.

Typically, a coupling agent is added when silica is used. One coupling agent conventionally used is bis-[3(triethoxysilyl) propyl]-tetrasulfide, which is commercially available under the tradename SI69 (Degussa, Inc.; New York, N.Y.). Additional coupling agents may include bis(3-(triethoxysilyl)propyl) trisulfide, bis (3-(triethoxysilyl) propyl) disulfide, 3-mercaptopropyltriethoxysilane, bis(3-(trimethoxysilyl) propyl) tetrasulfide, bis(3-(trimethoxysilyl)propyl)trisulfide, bis(3-(trimethoxysilyl)propyl) disulfide, 3-mercaptopropyltrimethoxysilane, 3-(trimethoxysilyl)propyl)diethylthiocarbamyl tetrasulfide, and 3-(trimethoxysilyl)propyl)benzothiazyl tetrasulfide. These agents are typically employed in an amount from about 1 to about 20 phr, and more preferably from about 3 to about 15 phr. Advantageously, less coupling agent is required when the functionalized polymers of this invention, which include a silane functionality, are employed.

Reinforced rubber compounds can be cured in a conventional manner with known vulcanizing agents. For example, sulfur or peroxide-based curing systems may be employed. For a general disclosure of suitable vulcanizing agents one can refer to Kirk-Othmer, ENCYCLOPEDIA OF CHEMICAL TECHNOLOGY, 3$^{rd}$ Edition, Wiley Interscience, N.Y. 1982, Vol. 20, pp. 365-468, particularly VULCANIZATION AGENTS AND AUXILIARY MATERIALS pp. 390-402, or *Vulcanization* by A. Y. Coran, ENCYCLOPEDIA OF POLYMER SCIENCE AND ENGINEERING, 2$^{nd}$ Edition, John Wiley & Sons, Inc., 1989. Vulcanizing agents may be used alone or in combination. This invention does not appreciably affect cure times. Typically, vulcanization is effected by heating the vulcanizable composition; e.g., it is heated to about 170° C. Cured or crosslinked polymers may be referred to as vulcanizates.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. The polyolefin additives are preferably added during preparation of the initial masterbatch. Once this initial masterbatch is prepared, the vulcanizing agents are blended into the composition. The composition can then be processed into tire components according to ordinary tire manufacturing techniques including standard rubber curing techniques. Rubber compounding techniques and the additives employed therein are generally known as disclose in *The Compounding and Vulcanization of Rubber*, by Stevens in RUBBER TECHNOLOGY SECOND EDITION (1973 Van Nostrand Reihold Company) .Pneumatic tires can be made according to U.S. Pat. Nos. 5,866,171; 5,876,527; 5,931,211; and 5,971,046, which are incorporated herein by reference.

The functionalized polymers of this invention can also be used in the manufacture of hoses, belts, shoe soles, window seals, other seals, vibration damping rubber, and other industrial products.

In order to demonstrate the practice of the present invention, the following examples have been prepared and tested as described in the Examples Section disclosed hereinbelow. The examples should not, however, be viewed as limiting the scope of the invention. The claims will serve to define the invention.

EXAMPLES

Examples 1-5

A catalyst was prepared by mixing 0.5 g of 1,3-butadiene monomer in hexanes, 0.32 mmol of Nd neodecanoate in hexanes, 31.7 mmol of methylaluminoxane in toluene, and 6.67 mmol of diisobutylaluminum hydride in hexanes within a dried and N$_2$ purged bottle equipped with a rubber septum. After two minutes of contact, 1.27 mmol of diethylaluminum chloride in hexanes was added to the mixture. The mixture was then aged at room temperature for about 22 minutes.

Polybutadiene polymer was prepared by mixing the catalyst solution prepared above with 611 g of 1,3-butadiene monomer in about 3,460 g of hexanes at 24° C. within a two-gallon stainless steel reactor equipped with an agitator and a jacket for temperature control. This mixture was agitated for about 11 minutes at 24° C. The jacket temperature was increased to 82° C. and agitation continued for 33 minutes, after which the jacket temperature was lowered to 70° C. Approximately 370 g of the polymer cement was sampled into five dried and N$_2$ purged bottles, identified as examples 1-5 in Table I.

Examples 2-5 were then reacted with a functionalizing agent as set forth in Table I. A hexane solution or suspension of alkoxysilane functionalizing agent was added to the respective samples and allowed to react. The polymer was quenched with a small amount of isopropyl alcohol and 2,6-t-butyl 4-methyl phenol (BHT) in hexanes, and was isolated by coagulation in isopropyl alcohol and successive drum drying. Comparative Example 1 had a 93% cis structure and less than 1% vinyl structure as determined by Fourier-Transform Infrared Spectroscopy (FTIR).

Table I also sets forth the Mooney Viscosity (ML 1+4@100° C.), the Mooney relaxation to 20% torque (T-80), the number average molecular weight ($M_n$), the weight average molecular weight ($M_w$), and molecular weight distribution as determined by GPC analysis, which was universally calibrated for polybutadienes based on polystyrene.

Examples 6-8

Polymers were prepared, functionalized, and analyzed as in Examples 1-5. Specifically, the catalyst solution was prepared by using 0.5 g of 1,3-butadiene in hexanes, 0.28 mmol of Nd neodecanoate in hexanes, 27.5 mmol of methylaluminoxane in toluene, 5.77 mmol of diisobutylaluminum hydride in hexanes, and 1.1 mmol of diethylaluminum chloride in hexanes. The catalyst solution was aged for 18 minutes, then mixed with additional 1,3-butadiene monomer at 27° C. The jacket temperature was increased to 82° C. and the mixture was agitated for 42 minutes. Comparative Example 6 had 91% cis microstructure and less than 1% vinyl structure.

Examples 9 and 10

Polymers were prepared, functionalized, and analyzed as in Examples 1-5, except that the aging time between the addition of the diisobutylaluminum hydride and the diethylaluminum chloride was three minutes, and the aging time for the catalyst was 15 minutes. Polymerization was allowed to proceed for 60 minutes at 82° C., after which time the jacket temperature was lowered to 70° C. Comparative Example 9 had 93% cis microstructure and less than 1% vinyl structure.

TABLE I

| | 1 | 2 | 3 | 4 | 5 | 6 | 7 | 8 | 9 | 10 |
|---|---|---|---|---|---|---|---|---|---|---|
| Alkoxysilane Functionalizing Agent | none | ECMOS | GPMOS | MPMOS | TMOSPI | none | TEOSI | TEOSI | none | HAPEOS |
| Amount of silane (eq/Nd) | — | 20 | 20 | 20 | 20 | — | 25 | 25 | — | 50 |
| Alkoxysilane Reaction Temp (° C.) | — | 50 | 50 | 50 | 50 | — | 50 | 50 | — | 50 |
| Alkoxysilane Reaction Time (min) | — | 30 | 30 | 30 | 30 | — | 180 | 900 | — | 180 |
| ML1 + 4 @ 100° C. | 28 | 62 | 103 | 63 | 62 | 44 | 74 | 84 | 40 | 59 |
| T-80 (s) | 3.3 | 6 | 14.2 | 5.7 | 5.7 | 4 | 5.3 | 5.3 | 3.7 | 4 |
| $M_n$ (kg/mol) | 117 | 123 | 123 | 138 | 136 | 140 | 144 | 157 | 139 | 144 |
| $M_w$ (kg/mol) | 241 | 284 | 245 | 319 | 600 | 274 | 294 | 305 | 273 | 289 |
| $M_w/M_n$ | 2.1 | 2.3 | 2.0 | 2.3 | 4.4 | 2.0 | 2.0 | 1.9 | 2.0 | 2.0 |

Examples 11-15

A catalyst was prepared as in Examples 1-5, except that the catalyst was aged for 14 minutes at room temperature after charging the diethylaluminum chloride. Likewise, a similar polymerization technique was employed except that each example was functionalized with the same alkoxysilane functionalizing agent and then reacted for three hours, as set forth in Table II. Example 13 was desolventized by cast drying and successive vacuum oven drying. Examples 14 and 15 were treated with specified amounts of 2-ethylhexanoic acid (EHA), followed by 30 minutes of blending at 50° C. Example 14 was desolventized by isopropanol coagulation/drum drying, and Example 15 was desolventized by cast drying/vacuum oven drying. Comparative Example 11 had a 93% cis microstructure and less than 1% vinyl structure, and the yield was nearly stoichiometric.

TABLE II

| | 11 | 12 | 13 | 14 | 15 |
|---|---|---|---|---|---|
| Alkoxysilane Functionalizing Agent | none | GPMOS | GPMOS | GPMOS | GPMOS |
| Amount of silane (eq/Nd) | — | 50 | 50 | 50 | 50 |
| Alkoxysilane Reaction Temp (° C.) | — | 50 | 50 | 50 | 50 |
| Alkoxysilane Reaction Time (min) | — | 180 | 180 | 180 | 180 |
| Additive (eq/Nd) | none | none | none | EHA 20 | EHA 20 |
| ML1 + 4 @ 100° C. | 29 | 111 | 71 | 85 | 60 |
| T-80 (s) | 3.7 | 15.6 | 6.4 | 8.1 | 5.4 |
| $M_n$ (kg/mol) | 121 | 135 | 121 | 135 | 125 |
| $M_w$ (kg/mol) | 237 | 283 | 435 | 282 | 365 |
| $M_w/M_n$ | 2.0 | 2.1 | 3.6 | 2.1 | 2.9 |

Examples 16-18

A catalyst solution containing 0.31 g of 1,3-butadiene, 0.57 mmol of Nd neodecanoate in hexanes, 56.7 mmol of methylaluminumoxane in toluene, 11.9 mmol of diisobutylaluminum hydride in hexanes, and 1.13 mmol of diethylaluminum chloride in hexanes was prepared as in Examples 1-5, and aged for 30 minutes at 50° C. 567 g of 1,3-butadiene in 3,213 g of hexanes was mixed with the catalyst at 24° C. and agitated for 14 minutes. The jacket temperature was increased to 66° C. and the mixture was agitated for another 52 minutes. The polymers obtained were sampled to three dried, $N_2$-purged bottles, and labeled comparative examples 16, 17, and 18. Samples 17 and 18 were terminated with TEOS (tetra ethoxy silane). Comparative Example 16 had a 91% cis microstructure and less than 1% vinyl structure and the yield was nearly stoichiometric.

TABLE III

|  | 16 | 17 | 18 |
|---|---|---|---|
| Alkoxysilane Functionalizing Agent | none | TEOS | TEOS |
| Amount of silane (mmol) | — | 3 | 7.5 |
| Alkoxysilane Reaction temp (° C.) | — | 50 | 50 |
| Alkoxysilane Reaction time (min) | — | 30 | 30 |
| ML1 + 4 @ 100° C. | 38 | 40 | 40 |
| T-80 (s) | 3.6 | 4.0 | 3.7 |
| Mn (kg/mol) | 113 | 106 | 109 |
| Mw (kg/mol) | 234 | 222 | 224 |
| Mw/Mn | 2.06 | 2.09 | 2.07 |

Examples 19-23

A catalyst solution was prepared within a dried and $N_2$ purged bottle by combining 2.7 g of 1,3-butadiene monomer in hexanes, 25.1 mmol of triisobutylaluminum in hexanes, and 2.14 mmol of diethylaluminum chloride in hexanes. After aging for 4.5 minutes at room temperature, 0.86 mmol of Nd neodecanoate in hexanes was added. The catalyst was aged for two minutes.

Polybutadiene polymer was prepared by mixing 611 g of 1,3-butadiene monomer and 3,460 g of hexanes with the catalyst solution prepared above at 27° C. After two minutes, the jacket temperature was increased to 82° C., and after an additional 68 minutes of agitation, the jacket temperature was lowered to 68° C. This mixture was allowed to age for an additional 20 minutes, distributed to 5 separate bottles and labeled as Examples 19-23. Examples 21-23 were reacted with a alkoxysilane functionalizing agent as in Examples 1-5.

The polymer was quenched and isolated as in Examples 1-5. Comparative Example 20 was reacted with dioctyltin bis (2-ethyl hexyl maleate), a tin ester compound, in lieu of the alkoxysilane functionalizing agent. Comparative Example 19 had 97% cis microstructure and less than 1% vinyl structure.

TABLE IV

|  | 19 | 20 | 21 | 22 | 23 |
|---|---|---|---|---|---|
| Functionalizing or Coupling Agent | none | DOTBOM | GPMOS | GPMOS | GPMOS |
| Amount of Agent (eq/Nd) | — | 1.2 | 0.3 | 1.2 | 5.0 |
| Reaction Temp (° C.) | — | 50 | 50 | 50 | 50 |
| Reaction Time (min) | — | 60 | 900 | 900 | 900 |
| ML1 + 4 @ 100° C. | 32.9 | 38.7 | 39.7 | 40.7 | 46.0 |
| T-80 (s) | 4.0 | 4.7 | 4.7 | 4.7 | 5.7 |
| Mn (kg/mol) | 111.8 | 111.1 | 110.1 | 113.7 | 111.6 |
| Mw/Mn | 2.76 | 2.81 | 2.97 | 2.90 | 3.06 |
| Visual insoluble matter in THF at 0.02 w/v % | none | none | none | none | none |
| Cold flow resistance | 1.96 | — | — | 2.27 | — |

Examples 24-36

A catalyst solution containing 0.024 grams of 1,3-butadiene, 0.09 mmol of Nd neodecanoate in cyclohexane, 7.2 mmol of methylaluminumoxane in toluene, 3.6 mmol of diisobutylaluminum hydride in toluene, and a source of halogen was prepared as in Examples 16-18, and aged for 30 minutes at about 50° C. The specific source of halogen used in each example as set forth in Table V, as well as the amount. The following abbreviations have been used: diethylaluminum chloride (DEAC), silicon tetrachloride ($SiCl_4$), and zinc dichloride complexed with 1-decanol ($ZnCl_2$). All of the halogen sources were employed as a toluene solution.

300 g of 1,3-butadiene in 2,400 g of cyclohexane was mixed with the catalyst at about 80° C. for about one hour. The temperature was lowered to about 50° C. and a functionalizing agent was added as set forth in Table V. The resulting polymers were quenched with a small amount of methanol solution and 2,6-t-butyl 4-methyl phenol (BHT) in hexanes. The polymer was isolated by steam desolventization and successive drum drying of the crumbs on a hot roll mill at about 110° C.

In Examples 29-32, prior to quenching, 4.5 mmol of a secondary terminator was added and allowed to react for about 30 minutes at 50° C. The terminator used included styrene oxide (Sty-O) and epoxydized soy bean oil (E-SBO). The amount of E-SBO was based on the number of epoxy groups on the molecule.

The resulting polymers were each individually compounded into a rubber formulation that employed silica (Nipsil VN3™; Nippon Silica; Japan). Namely, an initial masterbatch was blended within an internal mixer at an initial temperature of about 110° C. for about 3.5 minutes. The masterbatch was allowed to cool and then re-milled within the same internal mixer for about 2 minutes. Then, a cure system was added while the compound was continually processed within the internal mixer at a temperature of about 80° C. for about 1 minute. The compounding recipe that was employed is set forth in the following table.

| COMPOUNDING RECIPE | |
| --- | --- |
| Ingredient | Parts per Hundred Rubber |
| Elastomer | 100 |
| Aromatic Oil | 10 |
| Silica | 50 |
| Stearic Acid | 2 |
| Antioxidant | 1 |
| Masterbatch Total | 163 |
| Zinc Oxide | 2.5 |
| Sulfur | 1.3 |
| Accelerators | 2.8 |
| Total | 169.6 |

Once compounded, each formulation was press cured at about 160° C. The cured samples were then analyzed to determine tensile strength at break and elongation at break according to JIS-K6301. Also, the samples were tested to determine tan δ at 50° C. (frequency at 100 rad/s and 3 percent strain), as well as Lambourne wear (Shimada Giken, Co. Ltd., Japan; at a load of 4.5 kg, a slip ratio of 60 percent, and a temperature of 50° C.). The results of this testing are provided in Table V. The values of tan δ and Lambourne wear were normalized against Example 41, and are therefore indexes, with higher values indicating better results.

TABLE V

| | 24 | 25 | 26 | 27 | 28 |
| --- | --- | --- | --- | --- | --- |
| Source of Halogen | DEAC | SiCl4 | $ZnCl_2$ | $ZnCl_2$ | $ZnCl_2$ |
| Amount of Halogen Source (mmol) | 0.18 | 0.05 | 0.09 | 0.09 | 0.09 |
| Functionalizing Agent | GPMOS | GPMOS | GPMOS | IPMQS | MPMOS |
| Amount of functionalizing agent (mmol) | 4.50 | 4.50 | 4.50 | 4.50 | 4.50 |
| Functionalizing Agent Reaction Time (min) | 30 | 30 | 30 | 30 | 30 |
| Functionalizmg Agent Reaction Temp (° C.) | 50 | 50 | 50 | 50 | 50 |
| 1,4-cis microstructure (%) | 96.3 | 96.4 | 97.6 | 97.5 | 97.4 |
| 1,2 microstructure (%) | 1.3 | 1.3 | 0.9 | 1.0 | 0.9 |
| ML1 + 4 @ 100° C. | 39 | 40 | 43 | 44 | 42 |
| Mw/Mn | 3.1 | 3.1 | 2.5 | 2.5 | 2.5 |
| Tensile Strength at Break (MPa) | 15.7 | 15.9 | 16.8 | 16.7 | 16.7 |
| Elongation at Break (%) | 580 | 575 | 580 | 585 | 580 |
| Tan δ at 50° C. (index) | 133 | 134 | 142 | 143 | 142 |
| Lambourne Wear (index) | 124 | 126 | 135 | 134 | 134 |

| | 29 | 30 | 31 | 32 | 33 | 34 | 35 |
| --- | --- | --- | --- | --- | --- | --- | --- |
| Source of Halogen | ZnCl2 | ZnCl2 | ZnCl2 | DEAC | SiCl4 | ZnCl2 | none |
| Amount of Halogen Source (mmol) | 0.09 | 0.09 | 0.09 | 0.18 | 0.05 | 0.09 | 0.00 |
| Functionalizung Agent | GPMOS | GPMOS | GPMOS | — | — | — | GPMOS |
| Amount of functionalizing agent (mmol) | 4.50 | 4.50 | 4.50 | — | — | — | 4.50 |
| Functionalizing Agent Reaction Time (min) | 10 | 10 | 10 | — | — | — | 30 |
| Functionalizing Agent Reaction Temp (° C.) | 50 | 50 | 50 | — | — | — | 50 |
| Secondary Terminator | Sty-O | E-SBO | MPMOS | — | — | — | — |
| 1,4-cis microstructure (%) | 97.5 | 97.5 | 97.6 | 96.3 | 96.4 | 97.6 | 82.4 |
| 1,2 microstructure (%) | 0.9 | 0.9 | 1.0 | 1.3 | 1.3 | 0.9 | 2.4 |
| ML1 + 4 @ 100° C. | 36 | 41 | 43 | 29 | 28 | 28 | 45 |
| Mw/Mn | 2.8 | 2.8 | 2.8 | 2.7 | 2.5 | 2.1 | 4.8 |
| Tensile Strength at Break | 17.1 | 17.4 | 18.0 | 14.8 | 14.7 | 14.5 | 11.7 |
| Elongation at Break (%) | 570 | 575 | 580 | 590 | 580 | 580 | 400 |
| Tan δ at 50° C. | 142 | 143 | 150 | 118 | 119 | 121 | 65 |
| Lambourne Wear | 136 | 137 | 142 | 110 | 112 | 116 | 77 |

Examples 36-41

A catalyst solution containing 0.1 grams of 1,3-butadiene, 0.37 mmol of Nd neodecanoate, 11.1 mmol of triisobutylaluminum in toluene, 3.7 mmol of diisobutylaluminum hydride, and 0.74 mmol of diethylaluminum chloride was prepared as in Examples 24-36. 300 grams of 1,3-butadiene monomer were polymerized in 2,400 g of cyclohexane, and the resulting polymer was terminated as set forth in Table VI. The resulting polymers were compounded as in Examples 24-36. Comparative Example 41, which was a commercially obtained high-cis polybutadiene polymer (BR01™;Japan Synthetic Rubber, Tokyo, Japan), was tested according to the procedures employed in Examples 24-35, including compounding.

TABLE VI

|  | 36 | 37 | 38 | 39 | 40 | 41 |
|---|---|---|---|---|---|---|
| Source of Halogen | DEAC | DEAC | DEAC | DEAC | None | — |
| Amount of Halogen Source (mmol) | 0.74 | 0.74 | 0.74 | 0.74 | None | — |
| Functionalizing Agent | GPMOS | IPMOS | MPMOS | — | — | — |
| Amount of functionalizing agent (mmol) | 4.50 | 4.50 | 4.50 | — | — | — |
| Functionalizing Agent Reaction Time (min) | 50 | 50 | 50 | — | — | — |
| Functionalizing Agent Reaction Temp (° C.) | 30 | 30 | 30 | — | — | — |
| 1,4-cis microstructure (%) | 96.6 | 96.5 | 96.6 | 96.5 | 3.1 | 95.0 |
| 1,2 microstructure (%) | 1.2 | 1.2 | 1.2 | 1.2 | 6.3 | 2.5 |
| ML1 + 4 @ 100° C. | 36 | 37 | 40 | 33 | n/a | 45 |
| Mw/Mn | 2.9 | 2.9 | 2.9 | 2.3 | 6.2 | 4.0 |
| Tensile Strength at Break (MPa) | 16.5 | 16.4 | 16.5 | 14.6 | n/a | 13.2 |
| Elongation at Break (%) | 585 | 575 | 580 | 575 | n/a | 550 |
| Tan δ at 50° C. (index) | 139 | 139 | 140 | 115 | n/a | 100 |
| Lambourne Wear (index) | 133 | 134 | 133 | 111 | n/a | 100 |

Examples 42-51

Examples 26, 34, and 41 were each compounded into a formulation that included a second elastomer as part of the elastomeric component of the rubber formulation. The formulations were compounded as in Examples 24-41, and the cured stocks were similarly analyzed.

Table VII sets forth the specific polymers employed in each example, as well as the amounts thereof. NR is natural rubber, and SBR is styrene-butadiene copolymer, which was experimentally synthesized using n-butyllithium. The SBR contained 35 percent by weight styrene, and 21% vinyl in the butadiene units, and was terminated with tin tetrachloride. The Lambourne wear and tan δ values in Table VII were normalized against Example 48.

TABLE VII

| | Examples | | | | | | | | | |
|---|---|---|---|---|---|---|---|---|---|---|
| | 42 | 43 | 44 | 45 | 46 | 47 | 48 | 49 | 50 | 51 |
| Polymer Example Number | 26 | 26 | 26 | 34 | 34 | 34 | 41 | 26 | 34 | 41 |
| Amount of Polymer (phr) | 50 | 10 | 5 | 50 | 10 | 5 | 50 | 50 | 50 | 50 |
| Other Elastomer | NR | NR | NR | NR | NR | NR | NR | SBR | SBR | SBR |
| Amount of Other Elastomer (phr) | 50 | 90 | 95 | 50 | 90 | 95 | 50 | 50 | 50 | 50 |
| Modulus at 300% (MPa) | 13.8 | 14.4 | 15.7 | 13.1 | 14.2 | 15.6 | 12.6 | 12.9 | 11.7 | 11.3 |
| Tensile at Break (MPa) | 26.3 | 26.5 | 27.3 | 23.1 | 25.3 | 27.2 | 22.5 | 24.1 | 21.5 | 20.5 |
| Elongation at Break (%) | 450 | 480 | 500 | 470 | 480 | 500 | 460 | 390 | 400 | 400 |
| Lambourne Wear | 130 | 111 | 96 | 104 | 94 | 78 | 100 | 123 | 97 | 94 |
| Tan δ at 50° C. | 125 | 110 | 95 | 105 | 93 | 91 | 100 | 121 | 97 | 91 |

Examples 53-60

Examples 26 and 35 were compounded into a tire formulation that included natural rubber as a second elastomeric component and contained varying amounts of silica filler. The compounding recipe and test methods were the same as in Examples 42-51, except that the amount of silica used in each example was varied as set forth in Table VIII, and bis(3 (triethoxysilyl)propyl)tetrasulfide (SI69™; Degussa-Hüls, Germany) was used as a silane coupling agent in Examples 57 and 59. The Lambourne wear and tan δ were normalized against Example 58.

TABLE VIII

| | Examples | | | | | | | |
|---|---|---|---|---|---|---|---|---|
| | 52 | 53 | 54 | 55 | 56 | 57 | 58 | 59 |
| Polymer Example Number | 26 | 26 | 26 | 26 | 26 | 26 | 34 | 34 |
| Amount of Polymer (phr) | 50 | 50 | 50 | 50 | 50 | 50 | 50 | 50 |
| Other Elastomer | NR | NR | NR | NR | NR | NR | NR | NR |
| Amount of Other Elastomer (phr) | 50 | 50 | 50 | 50 | 50 | 50 | 50 | 50 |
| Silica (phr) | 100 | 50 | 30 | 130 | 10 | 50 | 50 | 50 |
| Silane Coupling Agent (phr) | — | — | — | — | — | 5 | — | 5 |
| Modulus at 300% (MPa) | 15.1 | 14.0 | 12.8 | 9.4 | 10.1 | 15.5 | 13.1 | 13.6 |
| Tensile at Break (MPa) | 27.5 | 28.5 | 23.5 | 17.1 | 18.2 | 29.1 | 23.1 | 25.5 |
| Elongation at Break (%) | 420 | 450 | 460 | 210 | 510 | 410 | 470 | 430 |
| Lambourne Wear | 135 | 130 | 114 | 77 | 84 | 141 | 100 | 118 |
| Tan δ at 50° C. | 129 | 127 | 117 | 81 | 83 | 139 | 100 | 118 |

Various modifications and alterations that do not depart from the scope and spirit of this invention will become apparent to those skilled in the art. This invention is not to be duly limited to the illustrative embodiments set forth herein.

What is claimed is:

1. A functionalized polymer prepared by a process comprising the steps of:
    preparing a pseudo-living polymer by polymerizing conjugated monomer with a lanthanide-based catalyst, where said pseudo-living polymer is characterized by having greater than about 85 percent of the polymer in the 1,4-cis microstructure and less than about 3 percent of the polymer is in the 1,2- or 3,4-microstructure; and
    reacting the pseudo-living polymer with a functionalizing agent defined by the formula (I)

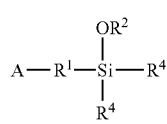

(I)

where A is a substituent that will undergo an addition reaction with a pseudo-living polymer, $R^1$ is a divalent organic group, $R^2$ is a monovalent organic group, and each $R^4$, which may be the same or different, is a monovalent organic group or a substituent defined by —$OR^5$ where $R^5$ is a monovalent organic group, with the proviso that A, $R^1$, $R^2$, $R^4$, and $R^5$ are substituents that will not protonate a pseudo-living polymer.

2. The polymer of claim 1, where the functionalizing agent is defined by the formula (II)

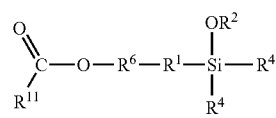

(II)

where $R^1$, $R^2$, and $R^4$ are as defined above, $R^6$ is a divalent organic group, and $R^8$ and $R^9$, which may be the same or different, are hydrogen atoms or monovalent organic groups, or, in the case where $R^6$ combines with $R^8$, $R^9$, or $R^{10}$ to form a cyclic group, or $R^8$ combines with $R^9$ or $R^{10}$ to form a cyclic group, $R^6$ may be a trivalent organic group and $R^8$, $R^9$, and $R^{10}$ may be divalent organic groups, with the proviso that these substituents will not protonate a pseudo-living polymer.

3. The polymer of claim 1, where the functionalizing agent is defined by the formulas (III) & (IV)

(III)

(IV)

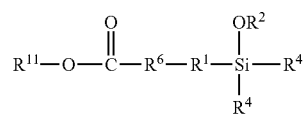

where $R^1$, $R^2$, $R^4$ and $R^6$ are as defined above, and $R^{11}$ is a monovalent organic group, or, in the case where $R^6$ combines with $R^{11}$ to form a cyclic group, $R^6$ may be a trivalent organic group and $R^{11}$ may be a divalent organic group, with the proviso that these substituents will not protonate a pseudo-living polymer.

4. The polymer of claim 1, where the functionalizing agent is defined by the formulas (V) or (VI)

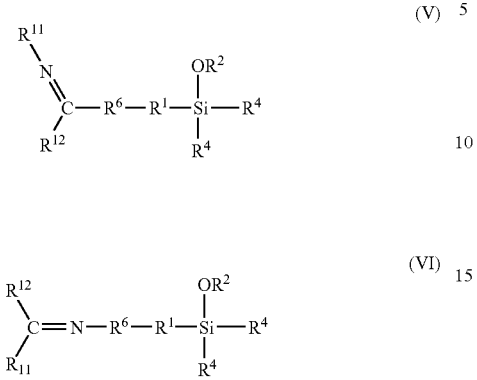

where $R^1$, $R^2$, $R^4$, $R^6$, and $R^{11}$ are as defined above, and $R^{12}$ is a hydrogen atom or a monovalent organic group, with the proviso that at least one of $R^{12}$ or $R^6$ in formula (V) is attached to the imine carbon via a carbon atom, $R^{11}$ or $R^{12}$ in formula (VI) is attached to the imine carbon via a carbon atom, $R^{11}$ in formula (V) is attached to the imine nitrogen via a carbon atom, and $R^6$ in formula (VI) is attached to the imine nitrogen via a carbon atom, or, in the case where $R^6$ combines with $R^{11}$ or $R^{12}$ to form a cyclic group, or $R^{11}$ combines with $R^{12}$ to form a cyclic group, $R^6$ may be a trivalent organic group, and $R^{11}$ and $R^{12}$ may be divalent organic groups, with the proviso that these substituents will not protonate a pseudo-living polymer.

5. The polymer of claim 1, where the functionalizing agent is defined by the formula (VII)

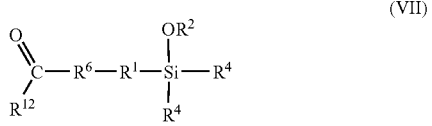

where $R^1$, $R^2$, $R^4$, $R^6$, and $R^{12}$ are as defined above, or, in the case where $R^6$ combines with $R^{12}$ to form a cyclic group, $R^6$ may be a trivalent organic group and $R^{12}$ may be a divalent organic group, with the proviso that these substituents will not protonate a pseudo-living polymer.

6. The polymer of claim 1, where the functionalizing agent is defined by the formula (VIII)

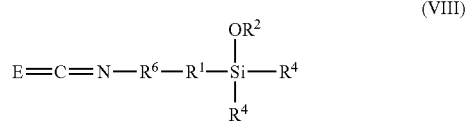

where $R^1$, $R^2$, $R^4$, and $R^6$ are as defined above, and where E is an oxygen atom or a sulfur atom, with the proviso that these substituents will not protonate a pseudo-living polymer.

7. The polymer of claim 1, where the functionalizing agent is defined by the formulas (IX) or (X)

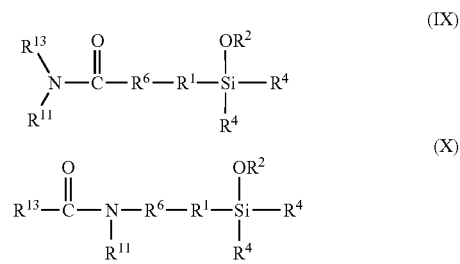

where $R^1$, $R^2$, $R^4$, $R^6$, and $R^{11}$ are as defined above, and $R^{13}$ is a monovalent organic group, or, in the case where $R^6$ combines with $R^{11}$ or $R^{13}$ to form a cyclic group, or $R^{11}$ and $R^{13}$ combine to form a cyclic group, $R^6$ may be a trivalent organic group and $R^{11}$ and $R^{13}$ may be divalent organic groups, with the proviso that these substituents will not protonate a pseudo-living polymer.

8. The polymer of claim 1, further comprising the step of quenching the polymer.

9. The polymer of claim 2, where the functionalizing agent comprises 3-glycidoxypropyltrimethoxysilane (GPMOS), 2-(3,4-epoxycyclohexyl)ethyltrimethoxysilane (EGMOS), 3-(trimethoxysilyl)propyl methacrylate, 3-glycidoxypropyl methyldiethoxysilane, 2-(3,4-epoxycyclohexyl)ethyltriethoxysilane, 2-(3,4-epoxycyclohexyl)ethyltriisopropoxysilane, 2-(3,4-epoxycyclohexyl)ethyltriphenoxysilane, (2-(3,4-epoxycyclohexyl)ethyl)methyldimethoxysilane, (2-(3,4-epoxycyclohexyl)ethyl)methyldiethoxysilane, (2-(3,4-epoxycyclohexyl)ethyl)ethyldiethoxysilane, (2-(3,4-epoxycyclohexyl)ethyl)methyldiphenoxysilane, 3-glycidoxypropyltriethoxysilane, 3-glycidoxypropyltriisopropoxysilane, 3-glycidoxypropyltriphenoxysilane, (3-glycidoxypropyl)methyldimethoxysilane, (3-glycidoxypropyl)ethyldiethoxysilane, (3-glycidoxypropyl)methyldiphenoxysilane, partial condensation products of 2-(3,4-epoxycyclohexyl)ethyltrimethoxysilane, partial condensation products of 2-(3,4-epoxycyclohexyl)ethyltriethoxysilane, partial condensation products of 2-(3,4-epoxycyclohexyl)ethyltriisopropoxysilane, partial condensation products of 2-(3,4-epoxycyclohexyl)ethyltriphenoxysilane, partial condensation products of 3-glycidoxypropyltrimethoxysilane, partial condensation products of 3-glycidoxypropyltriethoxysilane, partial condensation products of 3-glycidoxypropyltriisopropoxysilane, or partial condensation products of 3-glycidoxypropyltriphenoxysilane.

10. The polymer of claim 3, where the functionalizing agent comprises 3-(trimethoxysilyl)propyl methacrylate, 3-(meth) acryloyloxypropyltrimethoxysilane (MPMOS), 3-(meth) acryloyloxypropyltriethoxysilane, 3-(meth) acryloyloxypropyltriisopropoxysilane, 3-(meth) acryloyloxypropyltriphenoxysilane, (3-(meth) acryloyloxypropyl)methyldimethoxysilane, (3-(meth) acryloyloxypropyl)methyldiethoxysilane, (3-(meth) acryloyloxypropyl)ethyldiethoxysilane, (3-(meth)acryloyloxypropyl)methyldiphenoxysilane, partial condensation products of 3-(meth)acryloyloxypropyltrimethoxysilane, partial condensation products of 3-(meth) acryloyloxypropyltriethoxysilane, partial condensation products of 3-(meth) acryloyloxypropyltriisopropoxysilane, or partial condensation products of 3-(meth) acryloyloxypropyltriphenoxysilane.

11. The polymer of claim 4, where the functionalizing agent comprises N-(3-triethoxysilylpropyl)-4,5-dihydroimidazole (TEOSI) or N-(1,3-dimethylbutylidene)-(3-triethoxysilyl)-1-propaneamine (HAPEOS).

12. The method of claim 5, where the functionalizing agent comprises 4-(3-(triethoxysilyl)propoxy)benzophenone, 4-(3-(triethoxysilyl)ethyl)benzophenone, 4,4'-bis ((3-triethoxysilyl)propoxy)benzophenone, trimethoxysilyl)propoxybenzophenone, or 4,4'-bis((3-trimethoxysilyl)propoxy)benzophenone.

13. A vulcanizable composition of matter comprising:
a rubber component comprising a functionalized polymer prepared by a process comprising the steps of
preparing a pseudo-living polymer by polymerizing conjugated monomer with a lanthanide-based catalyst where said pseudo-living polymer is characterized by having greater than about 85 percent of the polymer in the 1,4-cis microstructure and less than about 3 percent of the polymer is in the 1,2- or 3,4-microstructure; and
reacting the pseudo-living polymer with a functionalizing agent defined by the formula (I)

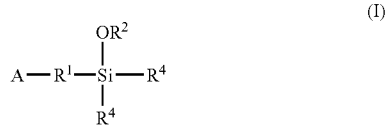

where A is a substituent that will undergo an addition reaction with a pseudo-living polymer, $R^1$ is a divalent organic group, $R^2$ is a monovalent organic group, and each $R^4$, which may be the same or different, is a monovalent organic group or a substituent defined by —$OR^5$ where $R^5$ is a monovalent organic group, with the proviso that A, $R^1$, $R^2$, $R^4$, and $R^5$ are substituents that will not protonate a pseudo-living polymer; and
a reinforcing filler including an inorganic filler.

14. The composition of claim 13, where the functionalizing agent is defined by the formula (II)

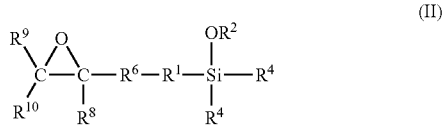

where $R^1$, $R^2$, and $R^4$ are as defined above, $R^6$ is a divalent organic group, and $R^8$ and $R^9$, which may be the same or different, are hydrogen atoms or monovalent organic groups, or, in the case where $R^6$ combines with $R^8$, $R^9$, or $R^{10}$ to form a cyclic group, or $R^8$ combines with $R^9$ or $R^{10}$ to form a cyclic group, $R^6$ may be a trivalent organic group and $R^8$, $R^9$, and $R^{10}$ may be divalent organic groups, with the proviso that these substituents will not protonate a pseudo-living polymer.

15. The composition of claim 13, where the functionalizing agent is defined by the formulas (III) & (IV)

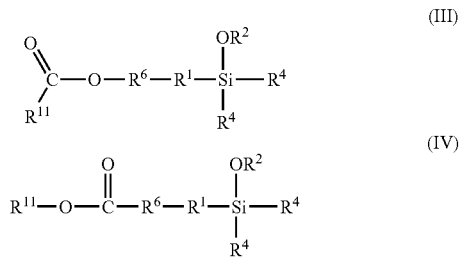

where $R^1$, $R^2$, $R^3$, and $R^6$ are as defined above, and $R^{11}$ is a monovalent organic group, or, in the case where $R^6$ combines with $R^{11}$ to form a cyclic group, $R^6$ may be a trivalent organic group and $R^{11}$ may be a divalent organic group, with the proviso that these substituents will not protonate a pseudo-living polymer.

16. The composition of claim 13, where the functionalizing agent comprises 3-isocyanatopropyltrimethoxysilane, 3-isocyanatopropyltriethoxysilane (IPMOS), 3-isocyanatopropyltriisopropoxysilane, 3-isocyanatopropyltriphenoxysilane, (3-isocyanatopropyl)methyldimethoxysilane, (3-isocyanatopropyl)methyldiethoxysilane, (3-isocyanatopropyl)ethyldiethoxysilane, (3-isocyanatopropyl)methyldiphenoxysilane, partial condensation products of 3-isocyanatopropyltrimethoxysilane, partial condensation products of 3-isocyanatopropyltriethoxysilane, partial condensation products of 3-isocyanatopropyltriisopropoxysilane, or partial condensation products of 3-isocyanatopropyltriphenoxysilane.

17. The composition of claim 13, where the functionalizing agent comprises tris(3-trimethoxysilylpropyl)isocyanulate, N-(3-trimethoxysilylpropyl)caprolactam, N(3-trimethoxysilylpropyl)pyrrolidone, tris (3-triethoxysilylpropyl)isocyanulate (TMOSPI), N(3-triethoxysilylpropyl)caprolactam, or N-(3-triethoxysilylpropyl)pyrrolidone.

18. The composition of claim 13, where the functionalizing agent is defined by the formulas CV) or (VI)

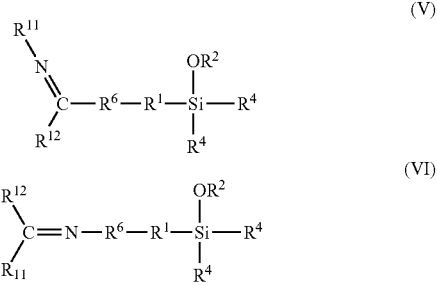

where $R^1$, $R^2$, $R^4$, $R^6$, and $R^{11}$ are as defined above, and $R^{12}$ is a hydrogen atom or a monovalent organic group, with the proviso that at least one of $R^{12}$ or $R^6$ in formula (V) is attached to the imine carbon via a carbon atom, $R^{11}$ or $R^{12}$ in formula (VI) is attached to the imine carbon via a carbon atom, $R^{11}$ in formula (V) is attached to the imine nitrogen via a carbon atom, and $R^6$ in formula (VI) is attached to the imine nitrogen via a carbon atom, or, in the case where $R^6$ combines with $R^{11}$ or $R^{12}$ to form a cyclic group, or $R^{11}$ combines with $R^{12}$ to form a cyclic group, $R^6$ may be a trivalent organic group, and $R^{11}$ and $R^{12}$ may be divalent organic groups, with the proviso that these substituents will not protonate a pseudo-living polymer.

19. The composition of claim 13, where the functionalizing agent is defined by the formula (VII)

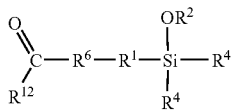

(VII)

where $R^1$, $R^2$, $R^4$, $R^6$, and $R^{12}$ are as defined above, or, in the case where $R^6$ combines with $R^{12}$ to form a cyclic group, $R^6$ may be a trivalent organic group and $R^{12}$ may be a divalent organic group, with the proviso that these substituents will not protonate a pseudo-living polymer.

20. The composition of claim 13, where the functionalizing agent is defined by the formula (VIII)

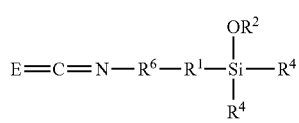

(VIII)

where $R^1$, $R^2$, $R^4$, and $R^6$ are as defined above, and where E is an oxygen atom or a sulfur atom, with the proviso that these substituents will not protonate a pseudo-living polymer.

* * * * *